United States Patent [19]

Archenholtz et al.

[11] Patent Number: 4,481,639
[45] Date of Patent: Nov. 6, 1984

[54] METHOD FOR TEMPERATURE CONTROL OF INDUCTORS

[75] Inventors: Åke Archenholtz; Kjell Bergman, both of Västerås, Sweden

[73] Assignee: ASEA Aktiebolag, Västerås, Sweden

[21] Appl. No.: 467,516

[22] Filed: Feb. 18, 1983

[30] Foreign Application Priority Data

Feb. 23, 1982 [SE] Sweden ................................ 8201122

[51] Int. Cl.³ ............................................. H05B 5/06
[52] U.S. Cl. .................................................... 373/150
[58] Field of Search .......................... 219/10.77, 10.75; 373/147–150

[56] References Cited

U.S. PATENT DOCUMENTS 3,064,109  11/1962  Peschel .............................. 219/10.77

*Primary Examiner*—Roy N. Envall, Jr.
*Attorney, Agent, or Firm*—Watson, Cole, Grindle & Watson

[57] ABSTRACT

The invention relates to a method for temperature control in a channel of an inductor unit of a channel-type induction furnace for iron or steel. The method is characterized in that the current intensity or the power is measured, and the measuring signal (I, P) is compared with a desired value ($I_b$, $P_b$) in a control means for controlling the power of the inductor, the power to the inductor being switched off or reduced at a value $I > I_b$ or $P > P_b$, where $I_b$ or $P_b$ corresponds to a temperature at or near the Curie point of the iron/steel.

In those cases where the inductor is supplied from a thyristor unit, the control can also be carried out so that a constant impedance, corresponding to the conditions at the Curie point, is maintained in the inductor circuit.

13 Claims, 5 Drawing Figures

METHOD FOR TEMPERATURE CONTROL OF INDUCTORS

BACKGROUND OF THE INVENTION

1. Field of the Invention

This invention relates to a method of controlling the temperature of a metal, e.g. iron or steel e.g., in a channel of an inductor unit of a channel-type induction furnace.

2. Description of the Prior Art

In certain applications, channel-type induction furnaces are used for continuous superheating of iron or steel which is heated whilst it flows in a molten state through one or more channels of an inductor unit of the furnace. After such superheating has continued for a certain time, for example, one or two shifts, it may be advantageous from the point of view of energy saving to shut off the inductor unit and allow it to cool to room temperature. A disadvantage with this method is that there is a risk of cracks forming in the lining material of the inductor unit. This situation becomes considerably more favorable if the lining material can be heat-retained at a temperature of 700°–800° C. However, a difficulty in this connection is that it has been considered necessary to use thermocouples, which may be difficult to apply and which may not be reliable in operation.

SUMMARY OF THE INVENTION

The invention is characterised in that the current intensity or power in the inductor unit is measured, and that a measuring signal (I, P) so measured is compared with a desired value ($I_b$, $P_b$) in a control means for the power of the inductor, whereby the power to the inductor is disconnected or reduced at a value $I > I_b$ or $P > P_b$, respectively, where $I_b$ or $P_b$ corresponds to a temperature near the Curie point of the metal, e.g., iron or steel.

The metal, e.g., iron or steel, can thus be allowed to remain in the channel or channels of the inductor unit at a temperature above room temperature and below its melting point. Compared with ferromagnetic metal in solid form at room temperature, the metal of the Curie point has lower strength and greater extension.

Upon supply of power to an inductor unit at a certain voltage, the current intensity (as well as the power) in the inductor unit rises rapidly when the metal in the channel(s) of the inductor unit changes from a magnetic to a non-magnetic material at the Curie point of the metal, and this feature is made use of in this invention. The active current in the inductor unit at a constant voltage supply can become more than twice as great when the temperature of the metal, e.g., iron, passes upwardly through the Curie point, and in this connection the abrupt current jump or power jump can be used to control the power supplied to the inductor unit in such a way that the temperature of the metal in the channel is maintained at the Curie point. In this way, an operating condition which is favorable for the inductor unit can be maintained while at the same time the energy losses can be considerably reduced as compared with keeping the metal in the channel(s) in a molten state.

BRIEF DESCRIPTION OF THE DRAWINGS

The invention will now be described by way of example and in greater detail with reference to the accompanying drawings, in which.

DESCRIPTION OF PREFERRED EMBODIMENTS

Figure 1:
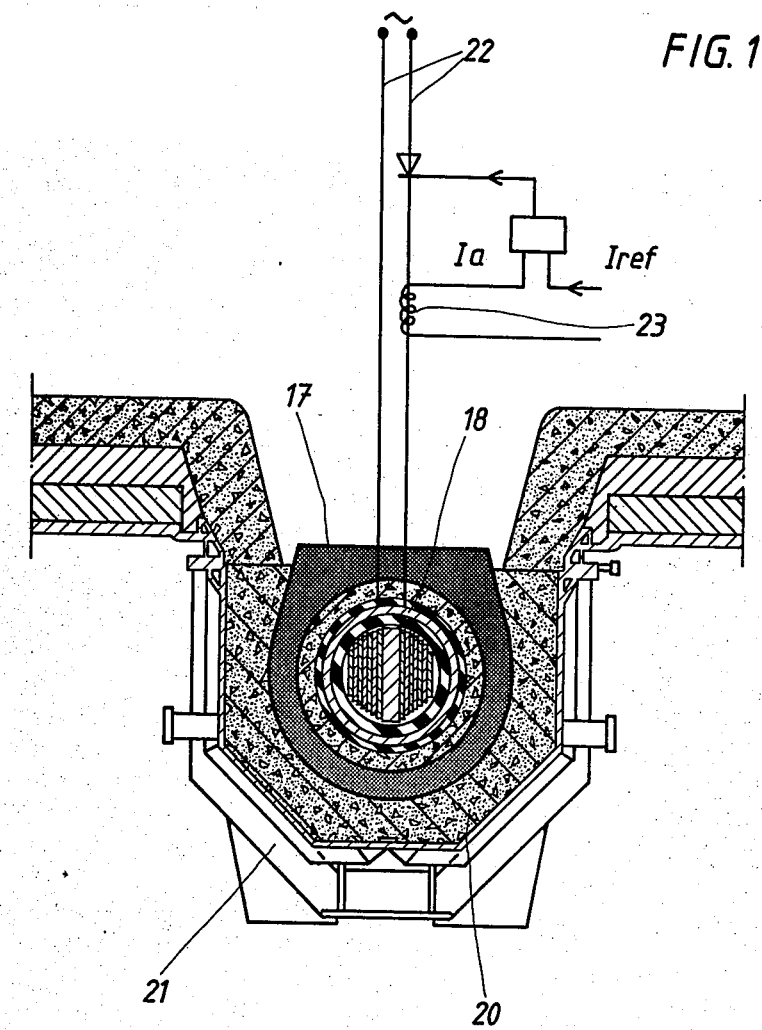
FIG. 1 is a sectional view of an inductor unit of a prior art channel-type inductor furnace to which the present invention is directed.

FIG. 1 shows a cross sectional view of an inductor unit of a channel-type induction furnace to which the control system of the present invention is applied. The inductor unit includes a coil 18, a lining 20 and a shell 21, and the channel pattern (part of the iron in the channel) is indicated by 17. The current $I_a$ to the coil 18 is supplied by lines 22 and is measured at 23. The difference, $I_a - I_{ref}$, is determined and used as a control signal for a thyristor device (or the like).

Figure 2:
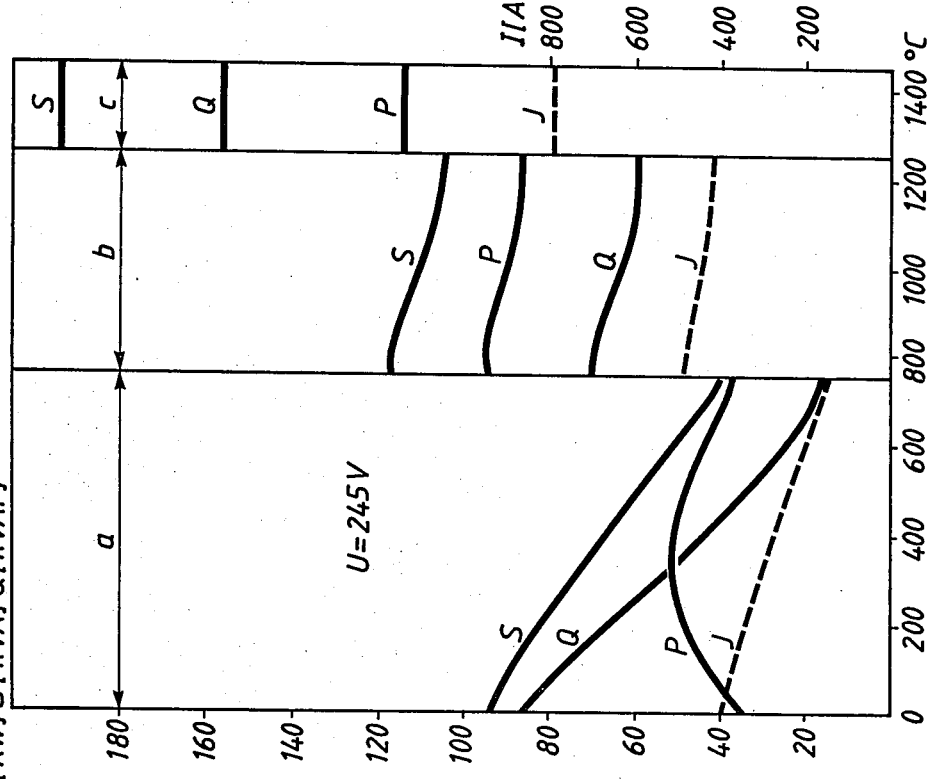
FIG. 2 is a graph illustrating the dependence of various electrical parameters upon temperature of metal in the channel of the inductor unit shown in FIG. 1, and FIGS. 3, 4 and 5 show three different examples of control circuits for use in controlling the temperature of a metal in a channel of the inductor unit shown in FIG. 1 by a method according to the invention.

The graph shown in FIG. 2 illustrates the change of apparent power S, measured in kVA, active power P, measured in kW, reactive power Q, measured in kVAr, as well as the current I, measured in A, with the change in temperature of the metal in a channel 17 upon startup of the furnace. Two y-axes are shown, the y-axis on the left representing the three power measurement P, S and Q and the y-axis on the right representing the current I. During the interval a, the metal in the channel has magnetic-possessing ferromagnetic properties. At the Curie point (circa 775° C.) i.e., at the transition between intervals a and b, the material loses its ferromagnetic properties so that during interval b the metal in the channel is non-magnetic. As can be seen in the graph, I, P, Q and S each rise rapidly at the transition between intervals a and b (i.e., at the Curie point of the metal), and this fact is made use of in the invention. Interval c is the molten condition of the metal. In the transition from interval b to interval c, there is another rapid rise in I, P, Q and S. In the example, the operating voltage U of the inductor unit is constant and typically equals 245 V.

Figure 3:
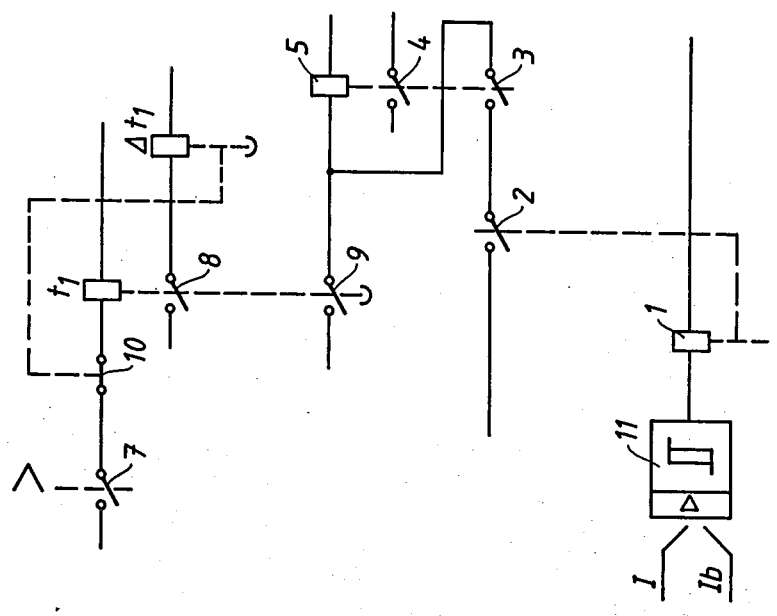

One example of a control circuit which is used to control the temperature of metal in a channel of an inductor unit utilizing the Curie point for the temperature control is shown in FIG. 3. The control circuit shown in FIG. 3 is designed to control the power supplied via a line containing a normally open switch 4 to one or more coils (not shown) of an inductor unit of a channel-type induction furnace. The control circuit includes a switch 7 which is manually closed when the control system is to be in operation; a relay $t_1$ which controls the operation of normally open switches 8 and 9, the relay $t_1$ being arranged to close each of the switches 8 and 9 a time $t_1$ after the relay has been energised; a relay $\Delta t_1$ which controls the operation of a normally closed switch 10, the relay $\Delta t_1$ being arranged to open the switch 10 a time $\Delta t_1$ after the relay $\Delta t_1$ has been energised; a relay 5 controlling actuation of the normally open switch 4 and a further, normally open switch 3; and a relay 1 which controls the actuation of a normally open switch 2. The control circuit further includes a control circuit 11 in which the actual inductor current, I, is compared with a desired current, $I_b$, and supplies an output signal for energising the relay 1 whenever $I<I_b$. The desired current $I_b$ is chosen to correspond to the actual value of the inductor current at a temperature of the metal in the channel of the inductor unit at or near the Curie point of the metal.

In operation of the control circuit shown in FIG. 3, the switch 7 is closed. The relay $t_1$ is immediately energised, causing the switches 8 and 9 to close at a time $t_1$ after energisation of the relay $t_1$. As soon as switch 8 is closed, the relay $\Delta t_1$ is energised causing the switch 10 to open a time $\Delta t_1$ after energisation of relay $\Delta t_1$. The relay $t_1$ is de-energised as soon as the switch 10 is opened resulting in switches 8 and 9 moving back into their open position. Thus, whilst switch 7 remains closed, the switch 9 is regularly opened and closed, switch 9 remaining open for a period $t_1$ and remaining closed for a period $\Delta t_1$.

The relay 5 is energised either via the line containing switch 9 or via the line containing switches 2 and 3. Thus, if $I \geq I_b$, switch 2 is open and the relay 5 is energised via the line containing switch 9. The switches 3 and 4 therefore follow switch 9 (i.e., when switch 9 closes, switches 3 and 4 close and when switch 9 opens, switches 3 and 4 open). Power is therefore applied at regular intervals to the inductor unit via the line containing switch 4 for periods of $\Delta t_1$ at intervals of $t_1$.

If, on the other hand, $I<I_b$, the relay 1 is energised and switch 2 is closed. Provided that switches 3 and 4 are closed, the relay 5 becomes self-holding and power is supplied to the inductor unit, via the line containing switch 4, whether switch 9 is open or closed. If, however, switch 3 is open, power is not supplied to the inductor unit until the next time that switch 9 is closed causing the relay 5 to be energised and the switches 3 and 4 to close.

Once switches 2 and 3 have been closed, power is supplied to the inductor unit until $I \geq I_b$ (i.e. until the temperature of the metal in the channel exceeds the Curie point). When $I \geq I_b$, the relay 1 is de-energised and switch 2 is opened. If switch 9 is already open, the relay 5 is de-energised immediately and switch 4 opens immediately. However, if switch 9 is closed, the relay 5 is not de-energised until, and switch 4 is not opened until, switch 9 opens.

Instead of measuring the current, I, and comparing it in control device 11 with the desired current, $I_b$, it is possible to measure the power, P, in the inductor unit and compare it in the control device 11 with a desired value of power, $P_b$. In this case the relay 1 is energised whenever $P<P_b$ and is de-energised when $P \geq P_b$.

It is possible to adjust the setting of $t_1$ and $\Delta t_1$. For example, $t_1$ may typically be adjusted from 0 to 10 minutes and $\Delta t_1$ may typically be adjusted from 0 to 60 seconds. The control is performed at a suitable voltage position, but if there is no such position, it is possible for the control to be performed between different voltage positions on the supply transformer.

Figure 4:
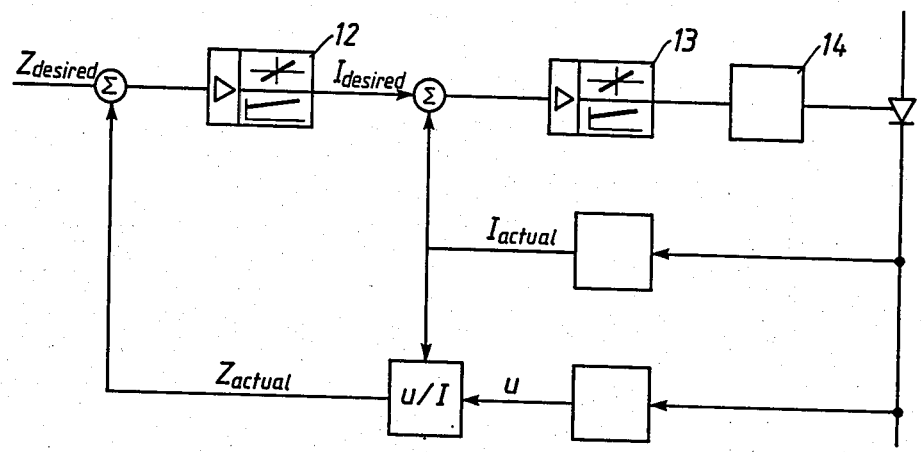

In those cases where the inductor unit is supplied from a thyristor unit, the control equipment may be designed so that a constant impedance is maintained in the inductor circuit (see FIG. 4).

In the circuit shown in FIG. 4, inductor current $I_{actual}$ and inductor voltage U are measured in measuring means 20 and 21, respectively, and are supplied to a device 22 from which a value of the impedance $Z_{actual}$ is computed. This value $Z_{actual}$ is compared in a device 23 with the desired impedance value $Z_{desired}$, and the deviation therefrom is supplied to a regulator 12. The output signal $I_{desired}$ from the regulator 12 is compared at 24 with the inductor current $I_{actual}$ and the signal therefrom is supplied to a current regulator 13 which supplies signals to a control pulse device 14 for controlling operation of the thyristor 25. The desired value of the impedance ($Z_{desired}$) is selected so as to correspond to the conditions within the region where change is made from magnetic to non-magnetic condition in the channel.

Figure 5:
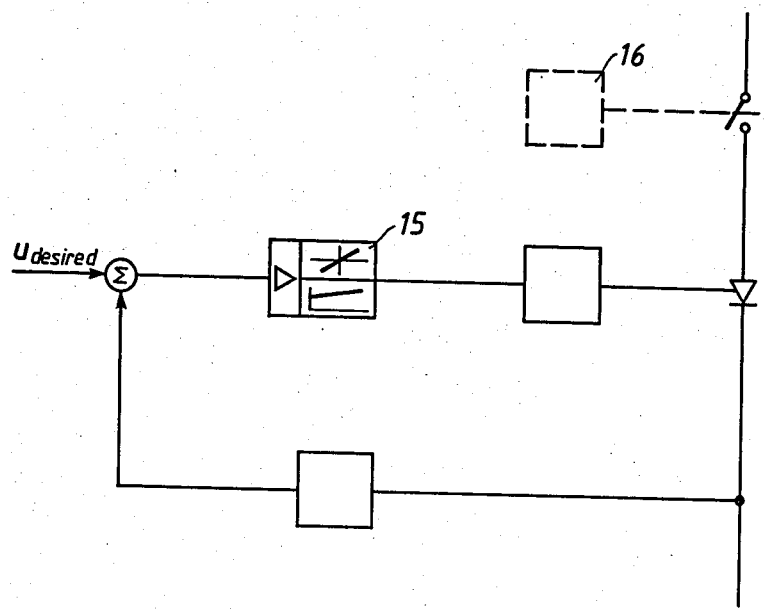

FIG. 5 illustrates another control method in connection with a thyristor-supplied inductor unit where control is based on constant inductor voltage U. The power to the inductor unit is then switched on at a certain time interval ($t_1 + \Delta t_1$) and is switched off according to the previously mentioned condition ($I > I_{desired}$). A voltage regulator is shown at 15, and 16 designates control equipment according to that shown in FIG. 3.

The method according to the invention can be varied in many ways within the scope of the following claims.

What is claimed is:

1. A method of controlling the temperature of a metal in a channel of an inductor unit of a channel-type induction furnace which is fed with a constant voltage, comprising measuring the electric current in the inductor unit, comparing the measured electric current with a desired value of electric current which corresponds to the value of the measured electric current at a temperature of the metal in the channel at or near the Curie point of the metal, and controlling the power supplied to the inductor unit, in dependence on said comparison, thereby to control the temperature of the metal in the channel.

2. A method according to claim 1, in which the power supplied to the inductor unit is switched off or reduced in dependence on when the measured electric current is greater than said desired value of electric current.

3. A method according to claim 2, in which switch-on or switch-off of power to the inductor unit take place with a certain time delay after the temperature of the metal in the channel passes through the Curie point.

4. A method according to claim 1, in which power is supplied periodically to the inductor unit when said measured electric current is greater than the desired value of electric current.

5. A method according to claim 4, in which the power is switched on at time intervals of $t_1 + \Delta t_1$ for a duration of time $\Delta t_1$.

6. A method according to claim 1, in which temperature control is achieved by maintaining a substantially constant impedance in the inductor circuit of the inductor unit.

7. A method according to claim 6, comprising measuring the current and voltage in the inductor circuit, deriving therefrom a measured impedance value, comparing the measured impedance value with a desired impedance value to obtain a deviation value, processing the deviation value in a regulator circuit, the output of which constitutes a desired value of current, and comparing said desired value of current with the measured value of current to control a thyristor circuit controlling the power supplied to the inductor unit.

8. A method according to claim 4 or 5, in which power is supplied to the inductor via a thyristor unit set for constant voltage control, switch-on of the power being performed at certain time intervals.

9. A method of controlling the temperature of a metal in a channel of an inductor unit of a channel-type induction furnace which is fed with a constant voltage, comprising measuring the power in the inductor unit, comparing the measured power with a desired value of power which corresponds to the value of the measured power at a temperature of the metal in the channel at or near the Curie point of the metal, and controlling the power supplied to the inductor unit, in dependence on said comparison, thereby to control the temperature of the metal in the channel.

10. A method according to claim 9, in which the power supplied to the inductor unit is switched off or reduced in dependence on when the measured power is greater than said desired value of power.

11. A method according to claim 10, in which switch-on or switch-off of power to the inductor unit take place with a certain time delay after the temperature of the metal in the channel passes through the Curie point.

12. A method according to claim 9, in which power is supplied periodically to the inductor unit when said measured power is greater than the desired value of power.

13. A method according to claim 9, in which the power is switched on at time intervals of $t_1 + \Delta t_1$ for a duration of $\Delta t_1$.

* * * * *